United States Patent Office 3,441,765
Patented Apr. 29, 1969

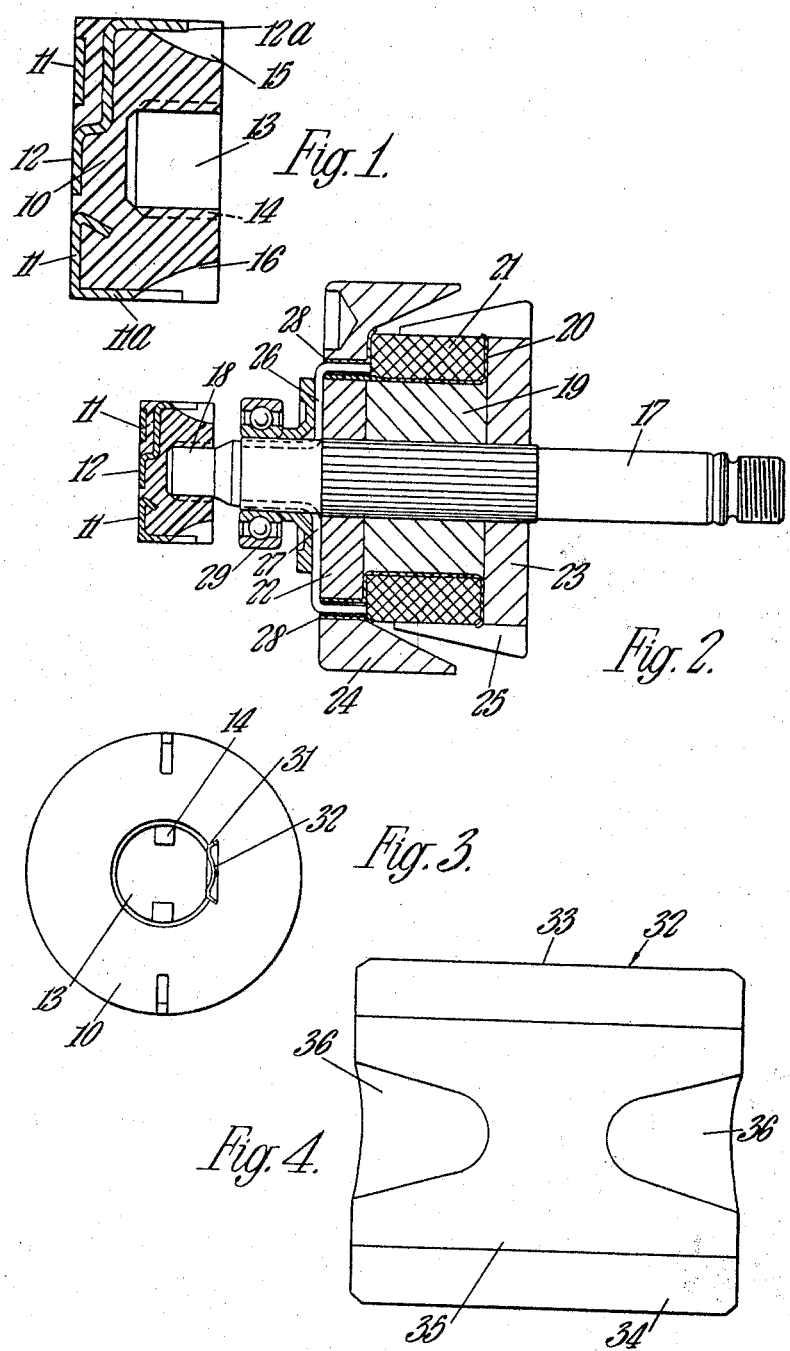

3,441,765
SLIPRING UNIT FOR DYNAMOELECTRIC MACHINES
Gordon Howard Maybury, Solihull, and Frank Woodward Moore, Great Barr, Birmingham, England, assignors to Joseph Lucas (Industries) Limited, Birmingham, England, a British company
Filed June 30, 1966, Ser. No. 561,894
Claims priority, application Great Britain, July 7, 1965, 28,748/65
Int. Cl. H01r 39/08
U.S. Cl. 310—232       1 Claim

ABSTRACT OF THE DISCLOSURE

In a face-type slipring unit, an insulating body is provided which has a bore for engagement with one end of a shaft. Exposed on one end face of the body is a central conductor which extends within the body to within a slot formed in the periphery of the body, together with an annular conductor surrounding the first conductor and extending within the body to a second slot formed in the periphery of the body.

---

This invention relates to a slipring unit for a dynamoelectric machine.

In one aspect, the invention resides in a slipring unit comprising an insulating body adapted for connection to a shaft, and a pair of conductors carried by said body, each conductor having a portion thereof exposed at one end of the body for engagement by a brush, and a further portion thereof exposed on the periphery of the body for the attachment thereto of a lead.

In another aspect, the invention resides in a method of manufacturing a slipring unit, comprising moulding a synthetic resin around a pair of conductors to produce a body which is adapted for connection to a shaft and in which the conductors each have one portion exposed at one end of the body for engagement by brushes, and a further portion extending within the body close to the periphery thereof, the method further including the step of cutting grooves in the body to expose said further portions of the conductors so that connections can be made thereto.

One example of the invention is illustrated in the accompanying drawings wherein:

FIGURE 1 is a sectional view of a slipring unit,
FIGURE 2 is a sectional view of a rotor assembly of a dynamoelectric machine utilizing the slipring unit,
FIGURE 3 is an end view of a modification of the unit shown in FIGURE 1, and,
FIGURE 4 is a plan view of the spring shown in FIGURE 3.

In order to manufacture the slipring unit shown in FIGURE 1, a pair of conductors 11, 12 are placed in a mould, and synthetic resin is then introduced into the mould to form a body 10 supporting the conductors 11, 12. At one end the body 10 is moulded with a blind bore 13 adapted to engage the end of a shaft, and extending inwardly from this bore are a pair of radial splines 14 for engagement with complementary grooves in the shaft, so that rotation of the shaft causes rotation of the body. At the other end of the body the conductors 11, 12 are exposed as shown to provide a central circular portion and a surrounding annular portion for engagement by brushes, and as shown the conductors are shaped to provide portions which key the conductors to the body, together with further axially extending portions 11a, 12a, which extend within the body close to the periphery thereof. After the body has been moulded, saw cuts 15, 16 are made in the body and the portions 12a, 11a. Leads (not shown) are then engaged in the cuts 15, 16, and connections are then made by soldering the leads to the conductors.

Referring now to FIGURE 2 the rotor assembly comprises a shaft 17 adapted at one end 18 to engage as a push fit in the bore 13 in the slip ring unit shown in FIGURE 2. A cylindicarl core piece 19 is an interference fit on the shaft 17 and supports an insulating former 20 which in turn supports the rotor winding 21 of the dynamoelectric machine. A pair of pole pieces 22, 23 having axially extending interdigitated portions 24, 25 are also supported as an interference fit on the shaft 17. The interdigitated portions 24, 25 of the pole pieces serve to enclose the windings 21.

Leads 26, 27 connecting the conductors 11, 12 of the slipring unit to the windings 21 extend for engagement in the saw cuts 15, 16 through holes 28 formed in the pole piece 22. Secured to the shaft 17 between the slipring unit and the pole piece 22 is a bearing 29, which in use, is engaged with the casing of the dynamoelectric machine and serves to support the rotor assembly for angular movement therein. The shaft 17 is driven by way of its end remote from the slip ring unit, the end extending from the casing.

In the modification shown in FIGURES 3 and 4 the wall of the bore 13 is formed in addition to the pair of radially extending splines with an axially extending tangentially disposed channel 31 within which is located a generally rectangular spring 32. The spring 32 (FIGURE 4) comprises a rectangular sheet of spring steel the longest sides 33, 34 of which are bent out of the plane of the remainder of the sheet so that the sheet becomes channel shaped in section. The part 35 of the sheet between the sides 33, 34 is further formed with a pair of axially extending depressions 36, the depth of each of which varies from a maximum at the short sides of the sheet to a minimum near the centre of the sheet. An area surrounding the centre of the sheet therefore remains undeformed.

The spring 32 is located in the channel 31 in such a manner that the part 35 of the sheet occupies part of the bore 13 so that when a shaft is inserted into the bore it will engage and ride in one of the depressions 36 in the spring and in so doing will flex the spring back into the channel 31, the shaft thereafter being frictionally gripped by the spring.

When the body is engaged with the shaft, it can be enclosed by a cover which is fixed relative to the shaft, and which conveniently carries not only the brushes but also diodes for conveying current to or from the windings of the machine.

Having thus described my invention what we claim as new and desire to secure by Letters Patent is:

1. A face-type slipring unit comprisng a cylindrical insulating body, a pair of angularly spaced peripheral slots in said body and extending to one end thereof, a closed bore extending into said body from said one end thereof, a first conductor having a first portion thereof exposed centrally at the other end of said body, a second portion terminating within one of said slots, and a third portion interconnecting the first and second portions and keying said first conductor to said body, and a second conductor having an annular portion exposed on said other end of said body and surrounding said first portion of the first conductor, a tag extending inwardly from said annular portion and keying said second conductor to said body, and a third portion extending from said angular portion and terminating within the other of said slots.

References Cited

UNITED STATES PATENTS

| | | |
|---|---|---|
| 2,961,385 | 11/1960 | McGall. |
| 3,185,878 | 5/1965 | Reisnecker _____ 310—232 |
| 3,286,069 | 11/1966 | Bugg _____ 29—597 X |
| 3,289,140 | 11/1966 | Slack _____ 310—232 X |
| 3,355,801 | 12/1967 | Priddy _____ 29—597 X |

ORIS L. RADER, *Primary Examiner.*

G. NUNEZ, *Assistant Examiner.*

U.S. Cl. X.R.

339—5